Aug. 23, 1938.   H. P. STEVENS ET AL   2,127,791
APPARATUS FOR PURIFYING RUBBER LATEX AND LIKE DISPERSIONS
Filed June 11, 1936   2 Sheets-Sheet 1
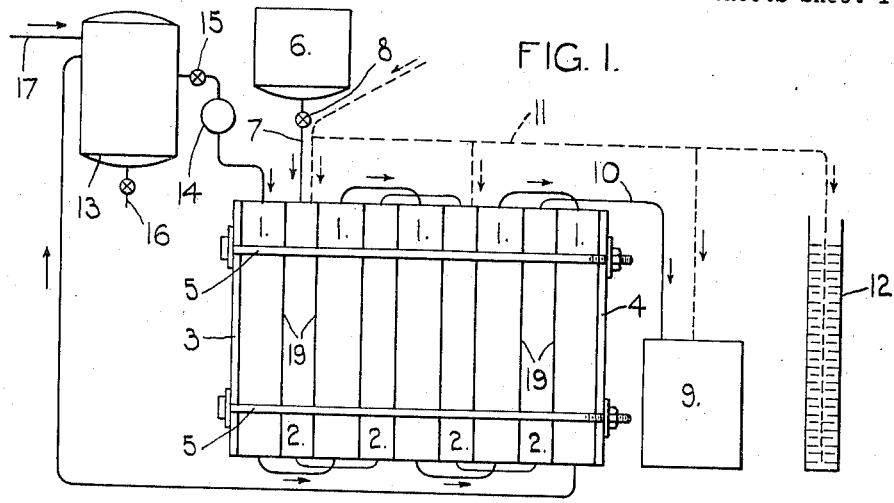
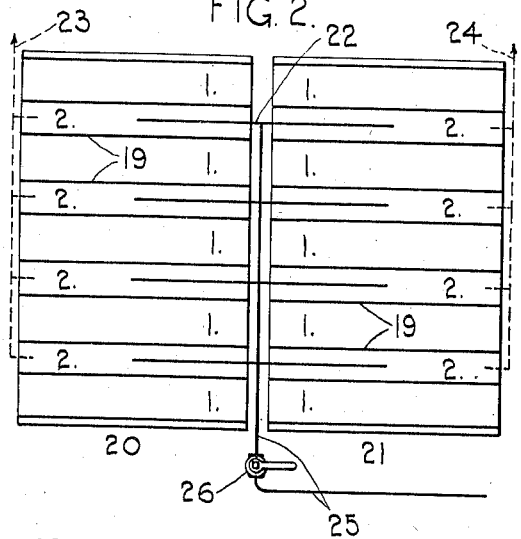
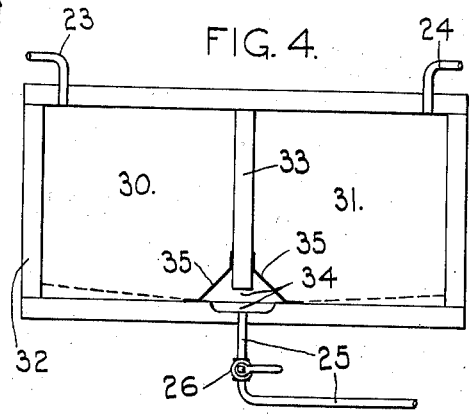
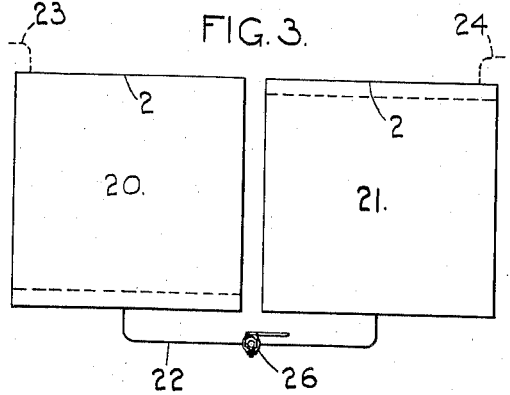
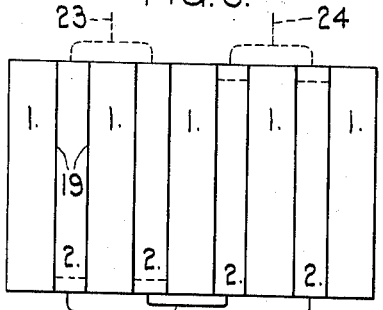
Inventors
Henry P. Stevens &
Joseph W. W. Dyer
by Ernest S. Mechlin
Attorney Aug. 23, 1938.  H. P. STEVENS ET AL  2,127,791
APPARATUS FOR PURIFYING RUBBER LATEX AND LIKE DISPERSIONS
Filed June 11, 1936  2 Sheets-Sheet 2
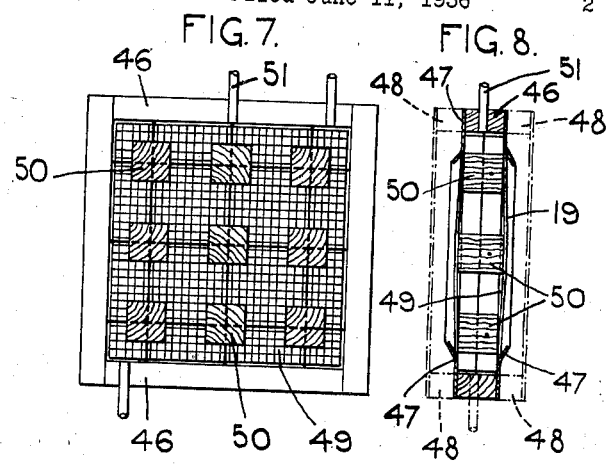
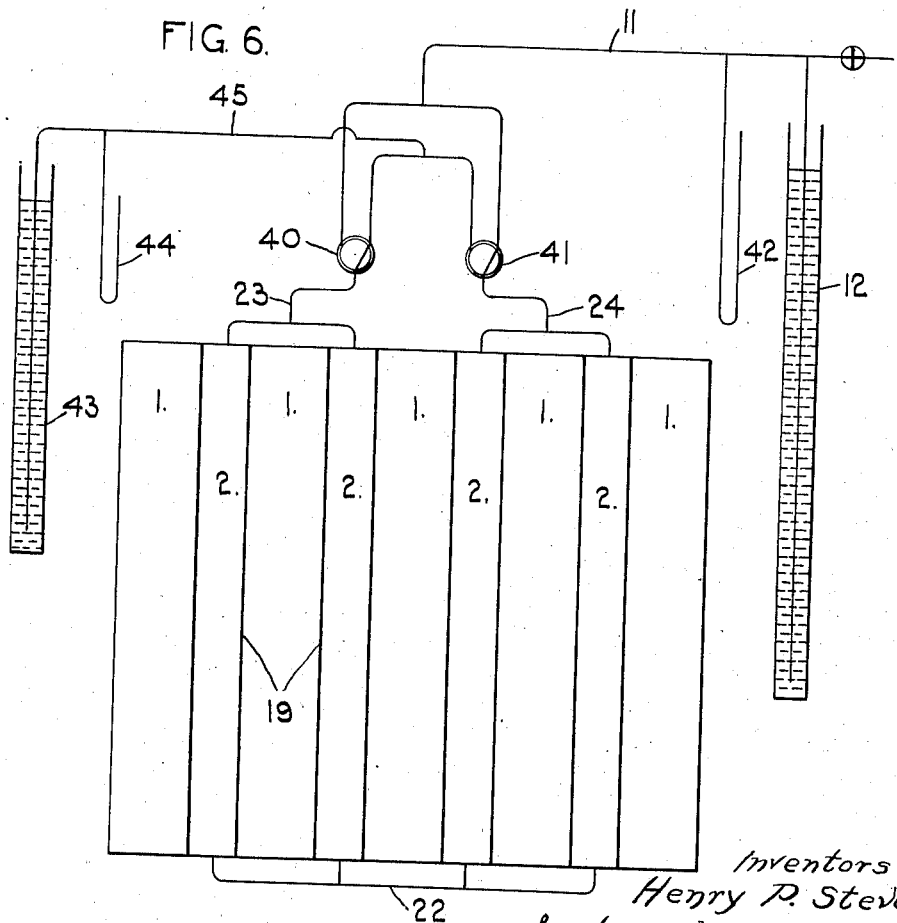
Inventors
*Henry P. Stevens*
*& Joseph W. W. Dyer*
By *Ernest J. Mechlin*
Attorney Patented Aug. 23, 1938

2,127,791

UNITED STATES PATENT OFFICE 2,127,791

APPARATUS FOR PURIFYING RUBBER LATEX AND LIKE DISPERSIONS

Henry Potter Stevens and Joseph William Ward Dyer, London Bridge, England, assignors, by mesne assignments, to The British Rubber Producers' Research Association, London, England Application June 11, 1936, Serial No. 84,762
In Great Britain June 17, 1935

3 Claims. (Cl. 23—252)

This invention relates to an apparatus for purifying rubber latex and similar natural or artificial dispersions by dialysis. Processes of purification by dialysis and the nature of the purified product obtained from latex thereby are described in co-pending application Serial No. 757,212, and the present invention has especial reference to apparatus for carrying out these and similar processes.

Both laboratory and commercial forms of dialyzing apparatus exist, e. g. the Gutbier laboratory dialyzer in which the colloidal solution under treatment is contained in a pleated parchment paper bag which is rotated in water while the contents are stirred; or the dialyzers in use in the artificial silk industry for recovering caustic alkali from alkali-cellulose dispersions, in which fresh water is circulated about parchment paper bounded cells containing the alkali-cellulose liquor which yields its alkali to the water through the septum which retains the cellulose.

The first form of apparatus referred to could not be embodied effectively on the large scale and would in any case have all the disadvantages, for use with rubber latex, which the second form, the commercial alkali-cellulose dialyzer, possesses in this particular utilization.

The purification of rubber latex by dialysis differs radically from the recovery of alkali already referred to. In the former case, the dialyzed colloid, and, in the latter case, the dialyzate or diffusate, is the desired product; in the former case there are initially substantial, and even at the end of purification, appreciable osmotic forces tending greatly to dilute the desired purified latex; in the former case also except with very thin stationary layers the dialysis is slow unless the latex is stirred or otherwise moved about and mixed so as to present fresh layers to the region of osmotic action next the diaphragm; finally, while in the latter case it is usual, and may be necessary for the life of the diaphragms, to work at ordinary temperature on account of the action of the caustic liquor on the membrane, latex may be safely and profitably because more speedily, dialyzed at moderately elevated temperatures.

Hitherto, commercial dialyzing apparatus has been almost exclusively designed for the treatment of alkaline liquor as an adjunct to the viscose silk process. The differing demands in the two cases call for difference in treatment and also in the apparatus for carrying such treatment into effect.

According to the present invention, dialyzing apparatus consists of an assemblage of thin cells which may be square, oblong, or circular. Diaphragms composed, e. g. of vegetable parchment paper separate successive cells one from another and the whole set is clamped tightly together, a water-tight joint being effected, e. g. by sheet rubber gaskets. Odd or alternate and even or intermediate cells contain respectively water and the latex under dialysis. The former are connected in series, and in the circuit is included a pump to circulate the water and a tank in which the circulating water may be heated, in turn heating the latex. By water feed and waste pipes in the tank, provision is made for the gradual discharge of the water laden with impurities from the latex and its replacement by fresh water.

One principal respect in which the apparatus differs from and, for the purpose of treating latex, is superior to other types of osmotic purifiers hitherto proposed or in use, is in the application of air pressure to serve a dual purpose in increasing the efficiency of the process. Pressure is maintained in the latex cells above that in the water cells. This opposes and reduces and may even reverse the tendency of the latex to become diluted by the water in consequence of the osmotic pressure possessed by the latex and possessed in special degree by the unpurified latex; and the pressure, by appropriate arrangement of the apparatus, is also made to cause circulation of the latex from cell to cell, thus stirring the latex and presenting fresh portions of it to the diaphragms which separate it from the water.

This principle of the dual application of pressure may be applied in one or more ways. For example, the intermediate latex cells may be, like the alternate water cells, in series, and the latex may flow in one direction from a pressure tank, through the cells, to a lower tank from which the air is displaced by the entering latex only through a pressure relief valve or through a water seal so that throughout its passage the latex is under pressure. Or the latex cells may be divided into two or more groups, the pressure being alternately applied to the respective groups and the latex in the cells thus transferred to and fro between the cells of the groups.

The invention will be further described with reference to the accompanying drawings which illustrate diagrammatically several embodiments by way of example, and in which,—

Fig. 1 shows an arrangement of dialyzing apparatus having a plurality of alternating water and latex cells, the latex being arranged to flow in series through the latex cells, while simultaneously the latex cells are under pressure and the water being passed or circulated in series through the alternate or water cells.

Figs. 2 and 3 show diagrammatically in plan and end view respectively a modified arrangement of the latex cells wherein these are divided into two groups, the latex being passed to and fro during the dialyzing treatment between the groups by alternating the pressure thereon.

Fig. 4 illustrates diagrammatically a similar alternating arrangement but employing twin latex cells, latex being adapted to pass to and fro from one compartment to the other under alternating pressure during the treatment.

Fig. 5 illustrates still a further application of the to and fro movement of the latex to couple pairs of latex cells, and Fig. 6 illustrates diagrammatically the lay-out of a pressure system by means of which alternating pressure on the groups of cells may be obtained.

Figs. 7 and 8 show respectively in front and side elevation an appropriate construction of water cell.

Referring now to the drawings but first more particularly to Figure 1, the dialyzing apparatus in each case comprises essentially a series of alternate water cells designated 1 and intermediate latex cells designated 2, a plurality of which, for instance four latex cells and five water cells in Fig. 1, are clamped together by means of end plates 3 and 4 and retaining bolts 5.

6 is a feed receptacle for the latex which is charged with the latex which is to be subjected to the dialyzing treatment and which communicates with the left-hand latex cell through a pipe 7 controlled by a valve 8. The latex cells in this embodiment are serially connected from left to right, the right-hand latex cell communicating with a receptacle 9 for the treated latex through a pipe 10.

The latex cells are maintained under pressure by a compressed air system 11 furnished with air under pressure from any convenient source, the head of pressure being maintained substantially constant by means of a liquid seal 12 which also serves to regulate or vary the pressure as desired.

It will be noted that the pressure system, in addition to being connected to the heads of the latex cells 2, is also directly connected with the receptacle 9 for the treated latex so that the pressure throughout the latex cells is approximately constant, the regulator 12 being set normally to give a pressure of from one to two lbs. per square inch over that of the water cells 1.

The alternate water cells 1 are also connected serially in a circulating system including a tank 13, pump 14 and cock 15, the tank 13 being furnished with a drain cock 16 by which vitiated or contaminated water may be withdrawn and a pipe 17 by which it may be replenished.

Where desired, the tank 13 may include provision for moderately heating the circulating water, as will be well understood, although such provision is not illustrated in the drawings.

As will be understood, dialyzing membranes or diaphragms 19 of vegetable parchment or other appropriate material separate the juxtaposed water and latex cells, the carbohydrates, salts and other crystalloid impurities dialyzing through the membranes while the inverse passage of the water which would tend to dilute the latex is retarded or reversed by the hydrostatic pressure on the latex.

Referring now more particularly to Figs. 2 and 3, an alternative arrangement of cells comprises two groups, generally designated 20 and 21, arranged side by side, and each comprising alternate water cells 1 and intermediate latex cells 2, the aligned latex cells of the two groups being interconnected by pipes 22 and the latex cells of the left-hand group 20 being connected in common to the air pressure system through a pipe 23, while those of the right-hand group 21 are connected in common through a pipe 24, the pipes 23 and 24 being valve controlled either manually or automatically.

The latex cells are maintained charged in any appropriate manner, for instance from a feed receptacle 6, the inter-group arrangement being that both sets of cells are approximately half-filled with latex. Consequently, when pressure is applied through the pipe 23 to the cells 20 of the left group the latex is forced from these cells into those of the right group, as shown in Figure 3, while on the other hand on the pressure being reversed, i. e. passed through the pipe 24, the converse takes place, the latex flowing from the cells to the right-hand group 21 into the cells of the left-hand group 20 the latex surface at the dialytic membranes 19 being thus constantly renewed.

During the treatment, the cell walls or diaphragms 19 are continuously bathed by the circulating water, as described with reference to Fig. 1, while at the conclusion of the treatment, when the purification is deemed sufficient, both pipes 23 and 24 are opened to pressure, and by means of a delivery pipe 25, including a valve 26, which for this purpose is opened, the purified latex is passed from the cells to a receptacle such as 9 (see Figure 1).

Thus in this arrangement the pressure is utilized in effecting three purposes separately and together advantageous to the dialytic process, viz:

(i) Thorough mixing of the whole body of latex or other colloidal dispersion by practically complete transfer through pipes from cell to cell to and fro alternately.

(ii) Renewal of the latex or other colloidal dispersion at the face of the dialytic membrane at each refilling of the cell by the returning colloidal liquid.

(iii) The retardation or reversal of dilution by water of the colloid under treatment. No one of these three effects above nor any two of them without the third ensures as rapid and efficient dialytic purification as the simultaneous action of all three, effectively embodied in the apparatus here described.

Referring now to Fig. 4 where an arrangement embodying the same underlying principle as that shown in Figs. 2 and 3 is illustrated, aligned latex cells are formed as dual or twin compartments 30, 31 of a common cell framework 32 having a central partition 33 foreshortened at its lower end to provide a passage 34 through which the latex may pass to and fro between the compartments 30 and 31.

23 and 24 again represent pipes through which either compartment may be opened to the pressure system and 25 is again the delivery pipe for the treated latex, while 35 are stays bracing the lower end of the partition 33 to the cell frame 32.

Referring now to Fig. 5, there is represented diagrammatically a still further alternative assemblage of cells utilizing to and fro flow of latex by means of alternating pressure, a single group of alternate water cells 1 and intermediate latex cells 2 being arranged with the two left-hand latex cells connected to the pressure system through a pipe 23 and the two right-hand latex cells similarly connected through a pipe 24, both of which, as previously described, are valve controlled. At their lower ends, the outermost latex cells 2 are interconnected as are the innermost cells 2, so that on pressure being applied through the pipe 23 to the heads of the left-hand latex cells 2, the latex is propelled through the interconnecting pipes to the right-hand cells and vice versa when the pipe 24 is opened to pressure.

In Fig. 6 an assemblage of cells with the latex coupled in groups, i. e. with the left-hand and right-hand pairs of latex cells coupled to each other, is illustrated, the left-hand pair being connected to the air pressure system 11 through a three-way valve 40 and the right-hand pair being similarly connected through a pipe 24 and valve 41.

In addition to the high pressure system 11, including its regulator 12 and a gauge 42, a low pressure or exhaust system is also provided comprising a liquid seal or regulator 43 and gauge 44 connected through a branch pipe 45 selectively with the valves 40 and 41.

The valves 40 and 41 may have a common actuating member so that as the right-hand latex cells are opened by their valve 41 to the high pressure side of the air system 11, the left-hand cells by their valve 40 are simultaneously opened to the low pressure side 45, whereat the latex passes from the right-hand cells to the left-hand cells against the back pressure provided by the regulator 43.

The converse movement of the latex back into the right-hand cells takes place when the valves 40 and 41 are reversed so that the valve 40 places the pipe 23 in connection with the high pressure side 11 of the pressure system while the valve 41 at the same time opens the pipe 24 to the low pressure side 45. It will be understood that this air pressure system may be applied to causing the to and fro movement of latex or other colloid in suitably connected cells, spacially disposed relative to one another in any convenient way as shown, e. g. in Figs. 2–6 and not merely as in Fig. 6 in which the air system is particularly depicted. And further that the actuating and discharge pressures, though normally about 3 lbs. and 2 lbs. per square inch are not necessarily limited to this range.

Where desired, a closed pressure system may be utilized, for instance when using a gas other than air, or when it is desired to conserve any volatile constituent, e. g. ammonia in the case of latex, the pipe 45 in this event being connected to a low pressure reservoir in turn connected through an appropriate compressor to a high pressure reservoir feeding the pipe 11.

The latex cells 2 are desirably as thin as practicable, and in Figs. 7 and 8 a cell construction is illustrated which provides latex cells effectively thinner than the thickness of the walls of the cell.

In these figures, 46 represents the rectangular framework of a water cell 1 and is separated by rubber gaskets 47 from the adjacent frames 48 of the juxtaposed latex cells.

49 are wire net or expanded metal reinforcements for the dialytic membranes or diaphragms 19 separating the water and latex cells and 50 are spacer blocks bridging the opposed reinforcements 49 of each water cell. 51 is a vent pipe. By reference more particularly to Fig. 8 it will be noted that the centre spacer block 50 is effectively longer than the remaining spacers so that each face of the water cell is rendered convex whereby the effective thickness of the juxtaposed latex cells is reduced except near their peripheries.

Such an arrangement possesses the advantage that very thin latex cells giving rapid dialysis can be combined with cell walls 48 not unreasonably thin and therefore able to carry pipes adequate to permit of a rapid flow of latex to and from the cells.

The cells may be constructed of wood or of metal, vulcanite or other suitable inert material, and where made of wood or metal they may be protected from leakage or corrosion by an internal coating of rubber, which method of protection may also be applied to the spacer mats 49 either before or after they are built in pairs with the blocks 50 between them.

It will be understood that it is only the water cells 1 which require reinforcement and support against collapse, since the latex cells 2 are maintained under excess internal pressure from the pressure system and/or the head of latex.

Moreover, it will be understood that where the apparatus is applied to the purification of latex by dialysis, softened water may with advantage be used, thus to reduce the tendency for the deposition of calcium hydroxide on the diaphragms 19 under the action of the ammonia in the latex.

A remarkable degree of purification by the removal of the diffusible impurities is obtained by the process and apparatus according to the invention, amounts approximating 90% of the total diffusible impurities being separated in a short space of time; for instance, in one example employing apparatus of the character illustrated in Fig. 6, latex having a 38% dry rubber content was dialyzed against seven times its volume of soft water at 55° C. and under driving and escaping air pressure, i. e. pressures on the latex of 2.7 and 1.7 lbs. per square inch, respectively. The percentages of diffusible impurities removed were 39% in two hours, 68% in five hours and 86% in nine hours, while the product at a dry rubber content of about 36.4 and 97% of the original material was recovered.

By the present invention there is provided an improved process and apparatus for the purification, and, it may be, simultaneous concentration of rubber latex and like dispersions containing crystalloid impurities.

What we claim is:—

1. Dialyzing apparatus comprising a series of thin dialyzer cells separated by membranes, alternate cells being adapted to contain water or an aqueous solution and intermediate cells the liquid to be dialyzed wherein the water cells contain means for reinforcing the membranes and maintaining them in position so arranged that the separating membranes project within the intermediate cell frames into the intermediate cells whereby to obtain effectively thin intermediate cells.

2. Dialyzing apparatus comprising the combination with a series of thin dialyzer cells, the alternate cells of which are adapted to contain water or an aqueous solution, and the intermediate cells of which are effectively thinner than the said alternate cells and contain the liquid to be dialyzed, of means for keeping the liquid to be dialyzed moving to promote dialysis by repeated change of the liquid of the dialyzing surfaces and means for applying air pressure to the intermediate cells thus simultaneously to control the influx of water or aqueous solution from the alternate cells, said air pressure means constituting part of the means for keeping the liquid in motion.

3. Dialyzing apparatus according to claim 2 wherein the means applying air pressure to the intermediate cells includes valve controlled conduits for applying the pressure alternatingly to different intermediate cells, thus to move the liquid to and fro between such cells.

HENRY P. STEVENS.
JOSEPH W. W. DYER.